United States Patent
Duan et al.

(10) Patent No.: US 11,656,652 B1
(45) Date of Patent: May 23, 2023

(54) RIGID PLATE FOR A DISPLAY OF AN INFORMATION HANDLING SYSTEM

(71) Applicant: Dell Products L.P., Round Rock, TX (US)

(72) Inventors: Yonghong Duan, Shanghai (CN); Xiu Feng Qiao, Shanghai (CN); Yaotsung Chang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/651,077

(22) Filed: Feb. 15, 2022

(51) Int. Cl.
*G06F 1/16* (2006.01)
(52) U.S. Cl.
CPC .................................. *G06F 1/1601* (2013.01)
(58) Field of Classification Search
CPC ........................................................ G06F 1/1601
See application file for complete search history.

(56) References Cited

U.S. PATENT DOCUMENTS

| | | | | |
|---|---|---|---|---|
| 7,903,398 B2* | 3/2011 | Carr | ...................... | G06F 1/1662 361/679.09 |
| 8,020,901 B2* | 9/2011 | Watanabe | ................ | B41J 29/00 292/87 |
| 8,068,337 B2* | 11/2011 | Yao | ...................... | H05K 5/0204 248/560 |
| 8,102,319 B2* | 1/2012 | Schlub | ................... | H01Q 5/364 343/702 |
| 10,019,029 B1* | 7/2018 | Yu | ...................... | H05K 7/1417 |
| 10,067,537 B2* | 9/2018 | Matsuoka | ............. | G06F 1/1616 |
| 10,148,000 B2* | 12/2018 | Hill | ....................... | G06F 1/1626 |
| 10,185,081 B2* | 1/2019 | Kobayashi | ......... | H04N 21/4312 |
| 10,594,351 B2* | 3/2020 | Wang | ..................... | H04M 1/026 |
| 2010/0245710 A1* | 9/2010 | Kim | .................. | G02F 1/133308 312/223.1 |
| 2016/0353593 A1* | 12/2016 | Park | ..................... | H05K 5/0234 |

* cited by examiner

*Primary Examiner* — Rockshana D Chowdhury
(74) *Attorney, Agent, or Firm* — McDermott Will & Emery LLP

(57) ABSTRACT

In one embodiment, a rigid plate of a display for an information handling system includes: a main rigid portion having a first plate thickness; and a recessed rigid portion having a second plate thickness less than the first plate thickness, the recessed rigid portion including one or more interlock holes disposed proximate to an edge of the recessed rigid portion, the one or more interlock holes configured to couple the rigid plate to a display chassis of the display via an interlock portion.

18 Claims, 4 Drawing Sheets

RIGID PLATE FOR A DISPLAY OF AN INFORMATION HANDLING SYSTEM

BACKGROUND

Field of the Disclosure

The disclosure relates generally to information handling systems, and in particular to a rigid plate for a display of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed rigid plate of a display for an information handling system includes: a main rigid portion having a first plate thickness; and a recessed rigid portion having a second plate thickness less than the first plate thickness, the recessed rigid portion including one or more interlock holes disposed proximate to an edge of the recessed rigid portion, the one or more interlock holes configured to couple the rigid plate to a display chassis of the display via an interlock portion.

In one or more of the disclosed embodiments, the second plate thickness is half as thick as the first plate thickness.

In one or more of the disclosed embodiments, the display chassis includes: a main chassis portion having a first chassis thickness; and a recessed chassis portion having a second chassis thickness less than the first chassis thickness, the recessed chassis portion including one or more interlock pegs disposed proximate to an edge of the recessed chassis portion, the one or more interlock pegs configured to couple to the one or more interlock holes to couple the rigid plate to the display chassis.

In one or more of the disclosed embodiments, the second chassis thickness is half as thick as the first chassis thickness.

In one or more of the disclosed embodiments, the first plate thickness and the first chassis thickness are equal in thickness.

In one or more of the disclosed embodiments, the second plate thickness and the second chassis thickness are equal in thickness.

In one or more of the disclosed embodiments, the rigid plate is comprised of a mixture including a carbon fiber and a polycarbonate material.

In one or more of the disclosed embodiments, the display chassis is comprised of a polycarbonate material.

In one or more of the disclosed embodiments, the interlock portion comprises a section of the display in which the recessed rigid portion of the rigid plate and the recessed chassis portion of the display chassis overlap.

In one or more of the disclosed embodiments, the interlock portion is formed by an injection molding process.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a rigid plate of a display for an information handling system that includes: a main rigid portion having a first plate thickness; and a recessed rigid portion having a second plate thickness less than the first plate thickness, the recessed rigid portion including one or more interlock holes disposed proximate to an edge of the recessed rigid portion, the one or more interlock holes configured to couple the rigid plate to a display chassis of the display via an interlock portion.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
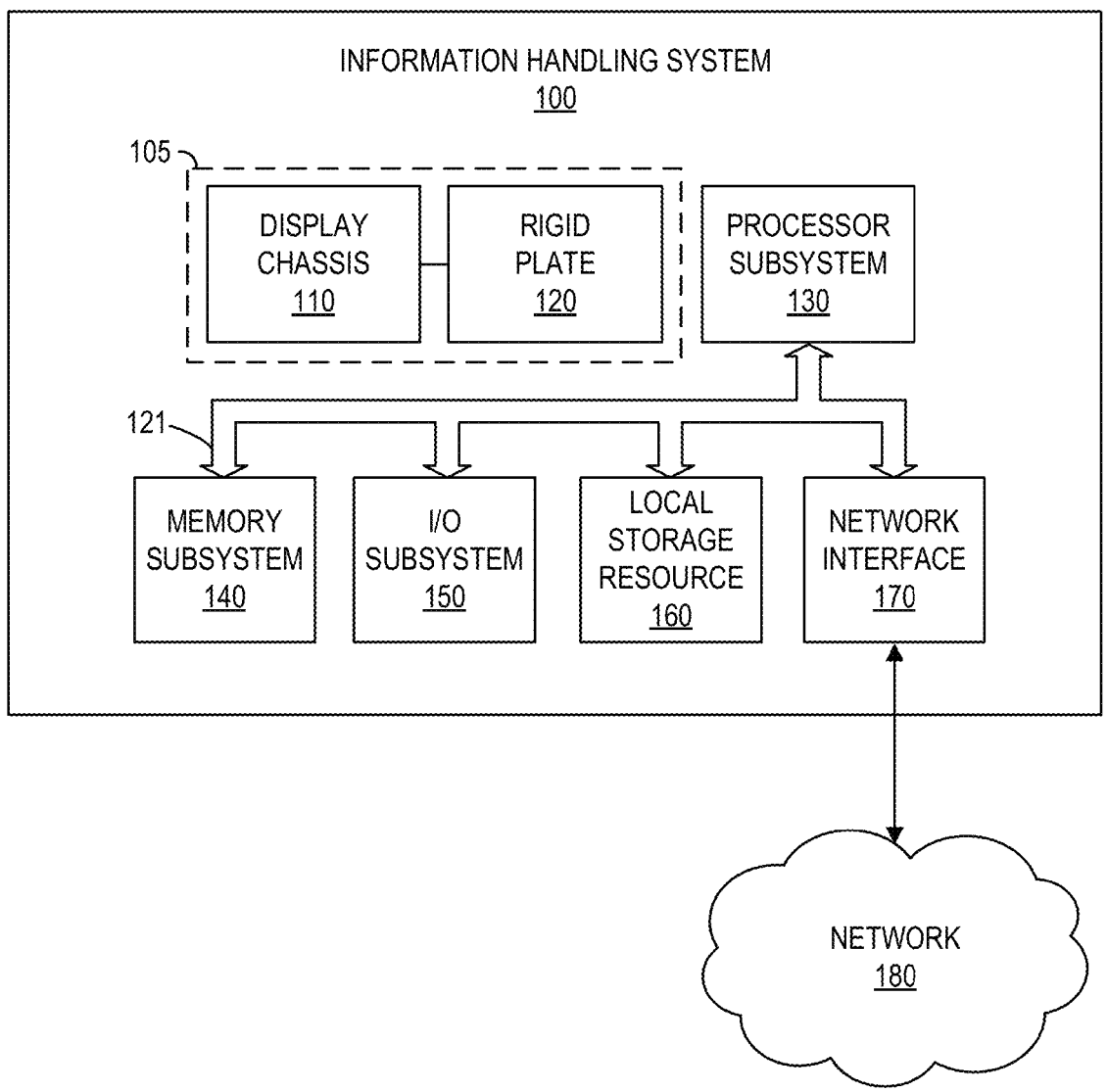
FIG. 1 is a block diagram of selected elements of an embodiment of a computing environment that includes an information handling system.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 130, which may comprise one or more processors, and system bus 121 that communicatively couples various system components to processor subsystem 130 including, for example, a memory subsystem 140, an I/O subsystem 150, a local storage resource 160, and a network interface 170. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. As shown in FIG. 1, information handling system 100 may additionally include a display 105. Display 105 may include a display chassis 110 and a rigid plate 120. In other embodiments, computing environment 190 may include additional, fewer, and/or different components than the components shown in FIG. 1.

In information handling system 100, processor subsystem 130 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 130 may interpret and/or execute program instructions and/or process data stored locally (e.g., in memory subsystem 140 and/or another component of information handling system 100). In the same or alternative embodiments, processor subsystem 130 may interpret and/or execute program instructions and/or process data stored remotely. In one embodiment, processor subsystem 130 may be or include a multi-core processor comprised of one or more processing cores disposed upon an integrated circuit (IC) chip. In other embodiments, processor subsystem 130 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 140 may comprise a system, device, or apparatus operable to retain and/or retrieve program instructions and/or data for a period of time (e.g., computer-readable media). Memory subsystem 140 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In one embodiment, I/O subsystem 150 may comprise a system, device, or apparatus generally operable to receive and/or transmit data to, from, and/or within information handling system 100. I/O subsystem 150 may represent, for example, a variety of communication interfaces, graphics interfaces, video interfaces, user input interfaces, and/or peripheral interfaces. In various embodiments, I/O subsystem 150 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 160 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 170 may be a suitable system, apparatus, or device operable to serve as an interface between information handling system 100 and a network 180. Network interface 170 may enable information handling system 100 to communicate over network 180 using a suitable transmission protocol and/or standard, including, but not limited to, transmission protocols and/or standards enumerated below with respect to the discussion of network 180. Network 180 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 170 may enable wired and/or wireless communications (e.g., NFC or Bluetooth) to and/or from information handling system 100.

In particular embodiments, network 180 may include one or more routers for routing data between client information handling systems 100 and server information handling systems 100. A device (e.g., a client information handling system 100 or a server information handling system 100) on network 180 may be addressed by a corresponding network address including, for example, an Internet protocol (IP) address, an Internet name, a Windows Internet name service (WINS) name, a domain name or other system name. In particular embodiments, network 180 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 180 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 180 and its various components may be implemented using hardware, software, or any combination thereof.

In one embodiment, display 105 may be a suitable system, apparatus, or device operable to display information processed by information handling system 100. In particular, display 105 may be or include an output device comprised of a light source configured to emit visible light to display information to a user, a casing to house the light source, and a power supply. In the embodiment illustrated in FIG. 1, display 105 may include a display chassis 110 and a rigid plate 120. In one embodiment, display 105 may be or include an organic light-emitting diode (OLED) display including an OLED light source. In other embodiments, display 105 may be or include a light-emitting diode (LED) monitor, a plasma display panel monitor, and/or any other type of monitor suitable for displaying information processed by information handling system 100.

In one embodiment, display chassis 110 may be a suitable system, apparatus, or device operable to provide a chassis, or casing, for one or more components housed within display 105. In particular, display chassis 110 may be or include a molded material (e.g., plastic, polycarbonate, and the like) operable to provide a chassis, or casing, for one or more components associated with a screen (e.g., an LCD panel, OLED panel, and the like) and/or a light source housed within display 105. For example, display chassis 110 may be coupled to rigid plate 120 to comprise a top cover, or "A" cover, operable to house a screen within display 105. Display chassis 110 may be coupled to rigid plate 120 via a bonded section, or "interlock portion" (e.g., interlock portion 200 shown in FIGS. 2A and 2B), of display 105. In one embodiment, display chassis 110 may be comprised of a polycarbonate material operable to bond to rigid plate 120 (i.e., the polycarbonate material therein) to form the interlock portion. For example, polycarbonate material comprising display chassis 110 may bond to polycarbonate material within rigid plate 120 during an injection molding process such that display chassis 110 and rigid plate 120 may be coupled via the interlock portion. Display chassis 110 is described in further detail with respect to FIGS. 2A through 4B.

In one embodiment, rigid plate 120 may be a suitable system, apparatus, or device operable to provide a chassis, or casing, for one or more components housed within display 105. Specifically, rigid plate 120 may be or include a molded material (e.g., carbon fiber, polycarbonate, and the like) operable to provide a chassis, or casing, for one or more components associated with a screen (e.g., an LCD panel, OLED panel, and the like) and/or a light source housed within display 105. For example, rigid plate 120 may be coupled to display chassis 110 to comprise a top cover, or "A" cover, operable to house a screen within display 105. As described above, rigid plate 120 may be coupled to display chassis 110 via an interlock portion (e.g., interlock portion 200 shown in FIGS. 2A and 2B), of display 105. For example, polycarbonate material within rigid plate 120 may bond to polycarbonate material comprising display chassis 110 during an injection molding process such that rigid plate 120 and display chassis 110 may be coupled via the interlock portion. In one embodiment, rigid plate 120 may be comprised of a mixture including a carbon fiber and a polycarbonate material. Rigid plate 120 is described in further detail with respect to FIGS. 2A through 4B.

Figure 2A:
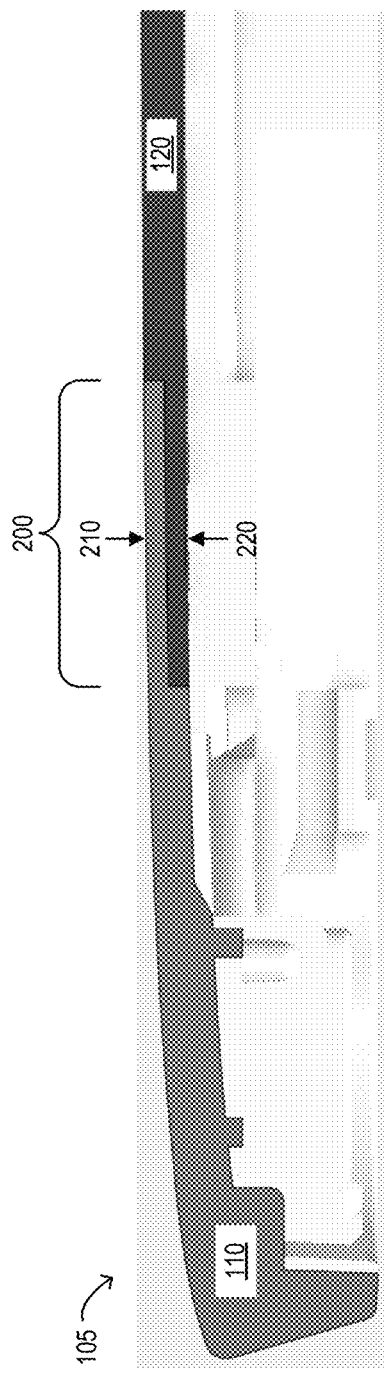
FIGS. 2A and 2B illustrate selected elements of an embodiment of a display that includes a display chassis, a rigid plate, and an interlock portion.
Figure 2B:
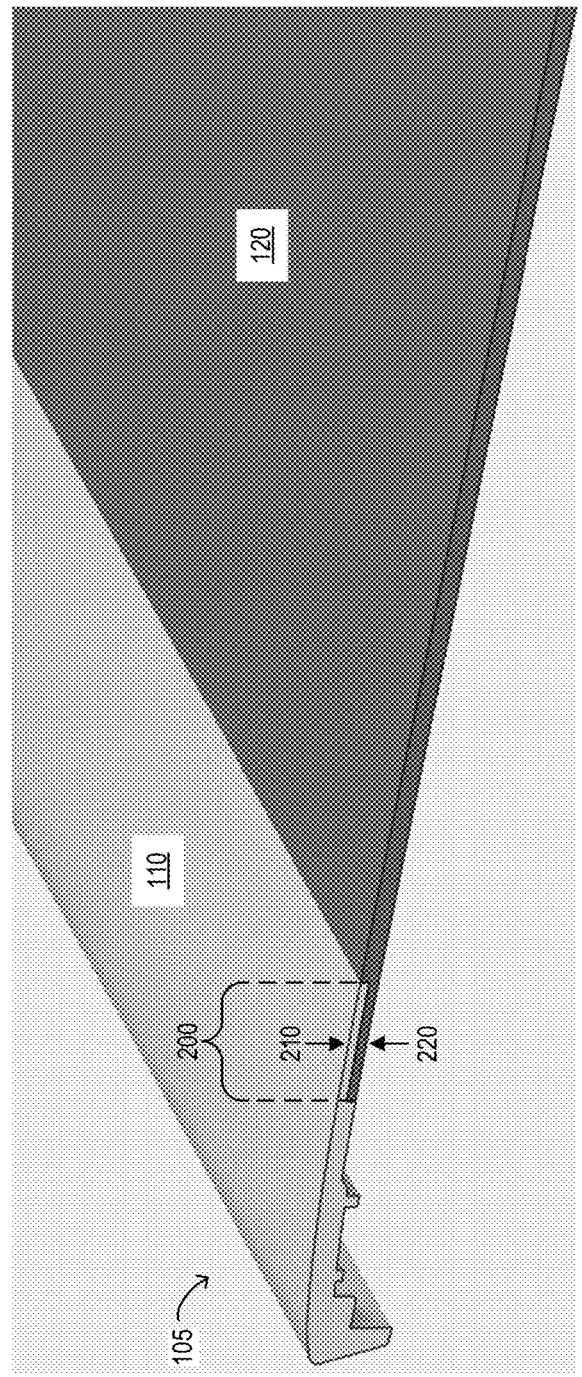

FIGS. 2A and 2B illustrate selected elements of an embodiment of a display that includes a display chassis, a rigid plate, and an interlock portion. In particular, FIG. 2A illustrates a cross-sectional side view of display 105 that includes display chassis 110 coupled to rigid plate 120 via interlock portion 200. FIG. 2B illustrates a cross-sectional three-quarter view of display 105 that includes display chassis 110 coupled to rigid plate 120 via interlock portion 200. In the embodiment illustrated in FIGS. 2A and 2B, display chassis 110 includes recessed chassis portion 210 extending from a main chassis portion (i.e., display chassis 110). Similarly, rigid plate 120 includes recessed rigid portion 220 extending from a main rigid portion (i.e., rigid plate 120). In other embodiments, display 105 may include additional, fewer, and/or different components than the components shown in FIGS. 2A and 2B.

Figure 4A:
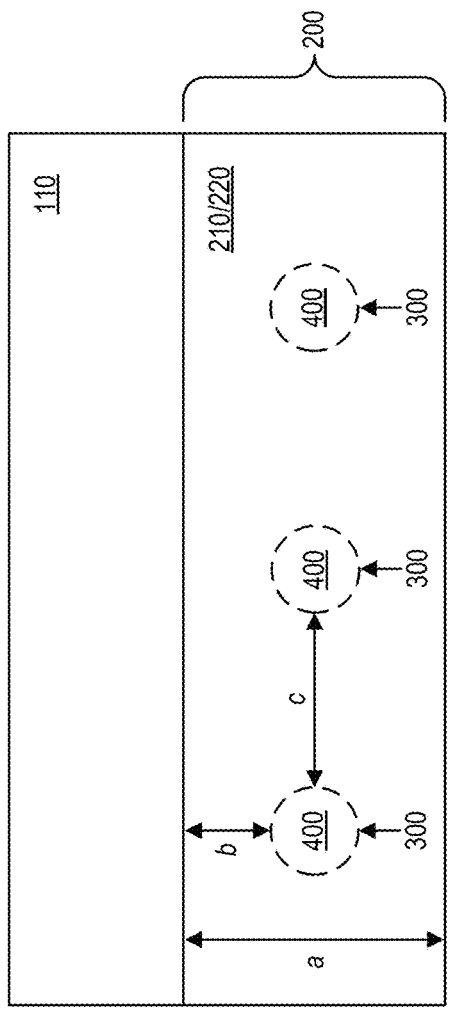
FIGS. 4A and 4B illustrate selected elements of an embodiment of a rigid plate coupled to a display chassis via an interlock portion.
Figure 4B:
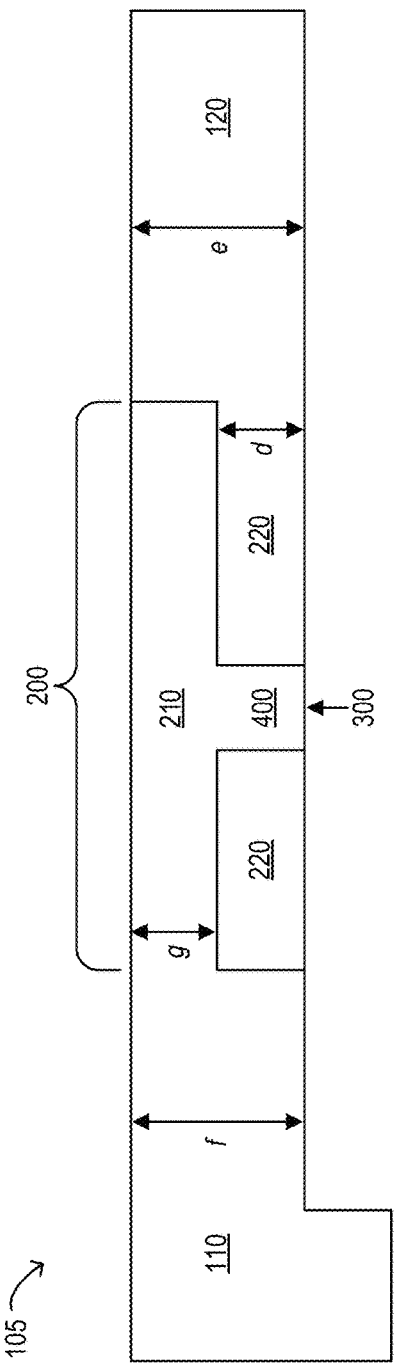

In the embodiment illustrated in FIG. 2A, display chassis 110 and rigid plate 120 may be coupled via interlock portion 200. Specifically, interlock portion 200 may comprise a section of display 105 in which recessed rigid portion 220 of rigid plate 120 and recessed chassis portion 210 of display chassis 110 overlap. In one embodiment, interlock portion 200 may be formed by an injection molding process. In particular, interlock portion 200 may be formed by coupling one or more interlock pegs of recessed chassis portion 210 of display chassis 110 to one or more interlock holes of recessed rigid portion 220 of rigid plate 120 in an injection molding process at a manufacturer of display 105 and/or information handling system 100. For example, one or more interlock pegs 400 disposed proximate to an edge of recessed chassis portion 210 may be coupled to one or more interlock holes 300 disposed proximate to an edge of recessed rigid portion 220 as shown in FIGS. 4A and 4B. In another embodiment, one or more interlock pegs of recessed chassis portion 210 of display chassis 110 may be removably coupled (e.g., snapped, fastened, screwed, riveted, and the like) to one or more interlock holes of recessed rigid portion 220 of rigid plate 120. For example, one or more interlock pegs 400 disposed proximate to an edge of recessed chassis portion 210 may be inserted into one or more interlock holes 300 disposed proximate to an edge of recessed rigid portion 220 as shown in FIGS. 4A and 4B.

Conventionally, a rigid plate of a display may have a uniform thickness. That is, a conventional rigid plate may have a uniform thickness such that an overlapping portion of the rigid plate received by a recessed portion of a display chassis may cause an increased overall thickness (i.e., with respect to a z height) of the top cover, or "A" cover, of a display. Specifically, the uniform thickness of the overlapping portion of the rigid plate coupled with the thickness of the recessed portion of the display chassis may cause the increased overall thickness of the top cover to reduce the area within the display allocated for one or more components housed within the display. For example, the increased overall thickness of the top cover may reduce the area within the display allocated for one or more components associated with a screen (i.e., an LCD panel, OLED panel, and the like) and/or a light source housed within the display. As such, the overall thickness of the display may be restricted to that of the overlapping portion of the conventional rigid plate coupled with the thickness of the recessed portion of the display chassis, thereby preventing a thinner design that may be more desirable to consumers.

In contrast, rigid plate 120 may be contoured to reduce the overall thickness of display 105 (i.e., with respect to a z height). Specifically, the main rigid portion of rigid plate 120 may have a first plate thickness that is thicker in dimension than a second plate thickness of recessed rigid portion 220 extending from the main rigid portion as shown in FIGS. 2A and 2B. In one embodiment, the second plate thickness of recessed rigid portion 220 may be half (i.e., approximately 50%) as thick as the first plate thickness of the main rigid portion. In another embodiment, the second plate thickness of recessed rigid portion 220 may be less than half (i.e., less than 50%) as thick as the first plate thickness of the main rigid portion. In yet another embodiment, the second plate thickness of recessed rigid portion 220 may be greater than half (i.e., greater than 50%) as thick as the first plate thickness of the main rigid portion. By reducing the second plate thickness of recessed rigid portion 220 and the second chassis thickness of recessed chassis portion 210, display 105 may achieve a thinner design, thereby reducing the overall thickness of display 105 (i.e., with respect to a z height) and increasing overall user experience.

Similarly, the main chassis portion of display chassis 110 may have a first chassis thickness that is thicker in dimension than a second chassis thickness of recessed chassis portion 210 extending from the main chassis portion. In one embodiment, the second chassis thickness of recessed chassis portion 210 may be half (i.e., approximately 50%) as thick as the first chassis thickness of the main chassis portion. In another embodiment, the second chassis thickness of recessed chassis portion 210 may be less than half (i.e., less than 50%) as thick as the first chassis thickness of the main chassis portion. In yet another embodiment, the second chassis thickness of recessed chassis portion 210 may be greater than half (i.e., greater than 50%) as thick as the first chassis thickness of the main chassis portion.

Figure 3:
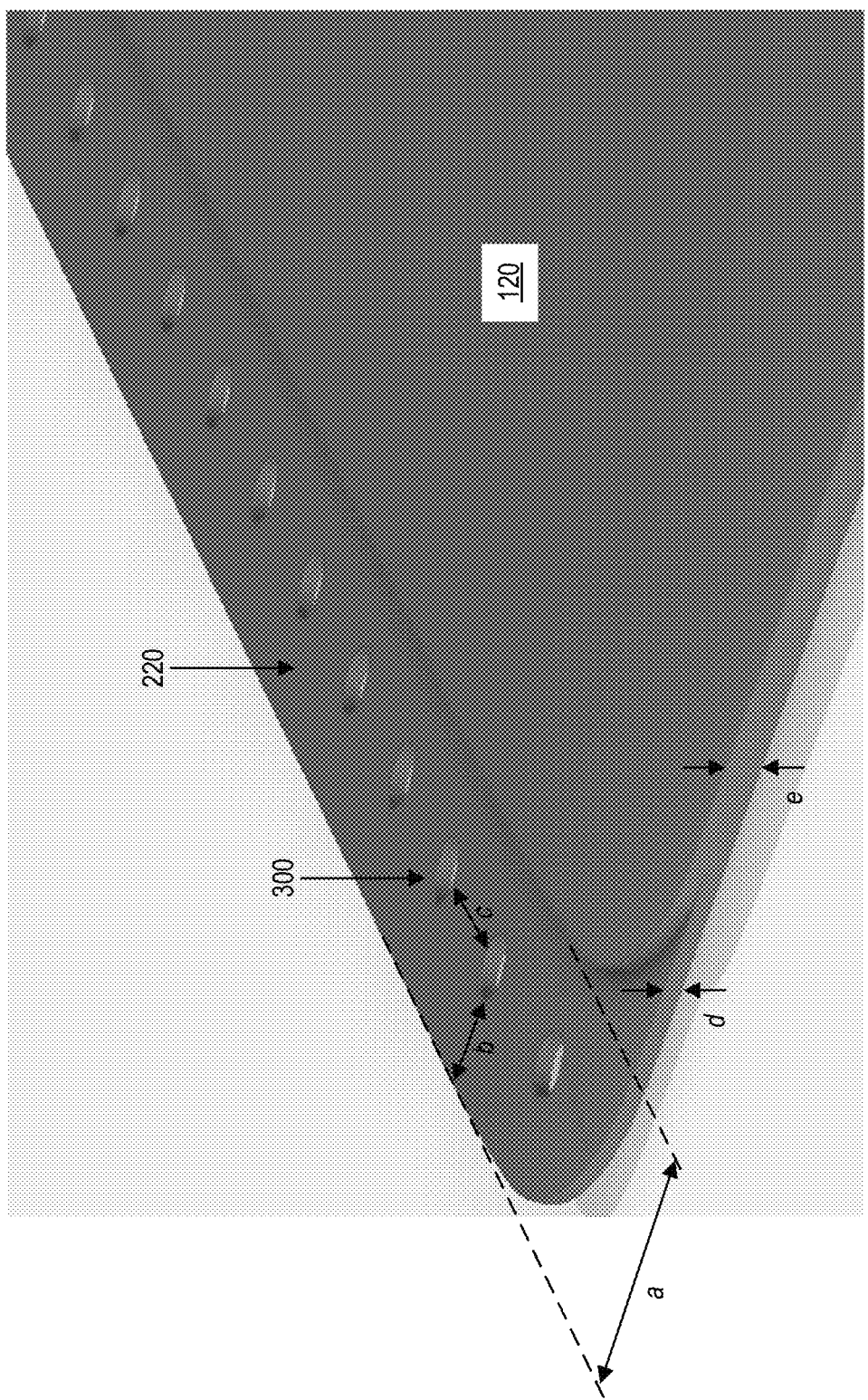
FIG. 3 illustrates selected elements of an embodiment of a rigid plate for a display of an information handling system.

FIG. 3 illustrates selected elements of an embodiment of a rigid plate for a display of an information handling system. In the embodiment illustrated in FIG. 3, rigid plate 120 includes recessed rigid portion 220 extending from a main rigid portion (i.e., rigid plate 120). Recessed rigid portion 220 may have a width operable to provide an optimal substrate for coupling rigid plate 120 to display chassis 110 via interlock portion 200. Specifically, recessed rigid portion 220 may have a width operable to provide an adequate substrate for bonding with recessed chassis portion 210 of display chassis 110 (e.g., during an injection molding process) without creating excessive stress by overly extending from the main rigid portion. For example, the width a of recessed rigid portion 220 in the embodiment illustrated in FIG. 3 may be 5-10 millimeters (mm), thereby providing an adequate substrate for bonding with recessed chassis portion 210 of display chassis 110. The recessed rigid portion 220 includes one or more interlock holes 300 disposed proximate to an edge of recessed rigid portion 220. In other embodiments, rigid plate 120 may include additional, fewer, and/or different components than the components shown in FIG. 3.

In one embodiment, rigid plate 120 may be contoured to reduce the overall thickness of display 105 (i.e., with respect to a z height) as described above with respect to FIGS. 2A and 2B. In particular, the main rigid portion of rigid plate 120 may have a first plate thickness that is thicker in dimension than a second plate thickness of recessed rigid portion 220 extending from the main rigid portion. In the embodiment illustrated in FIG. 3, the second plate thickness d of recessed rigid portion 220 may be half (i.e., approximately 50%) as thick as the second plate thickness e of the main rigid portion. For example, the second plate thickness d of recessed rigid portion 220 may be 0.4-0.6 mm and the first plate thickness e of the main rigid portion may be 0.8-1.2 mm. In one embodiment, a machining process may be used to remove material from an edge of the main rigid portion of rigid plate 120 to create recessed rigid portion 220 having the second plate thickness d. For example, a manufacturer may apply a machining process using rotary cutters (i.e., a milling process) to remove the material from main rigid portion of rigid plate 120, thereby creating recessed rigid portion 220 having the second plate thickness d. In other embodiments, the second plate thickness d of recessed rigid portion 220 may be less than half (i.e., less than 50%) as thick as the first plate thickness e of the main rigid portion, greater than half (i.e., greater than 50%) as thick as the second plate thickness e of the main rigid portion, and/or any other variation of thickness in relation to the first plate thickness e to reduce the overall thickness of display 105.

In one embodiment, each interlock hole 300 may be a suitable system, apparatus, or device operable to couple rigid plate 120 to display chassis 110. In particular, interlock holes 300 may be disposed proximate to an edge of recessed rigid portion 220 such that each interlock hole 300 may receive an interlock peg (e.g., interlock peg 400 shown in FIGS. 4A and 4B) to couple rigid plate 120 to display chassis 110. In the embodiment illustrated in FIG. 3, interlock holes 300 may be disposed across recessed rigid portion 220 in accordance with an optimal edge distance b and pitch distance c such that interlock holes 300 may couple rigid plate 120 to display chassis 110 without compromising the structural integrity of recessed rigid portion 220 (e.g., causing recessed rigid portion 220 to become overly brittle). For example, the optimal edge distance b may be greater than 2.5 mm and the optimal pitch distance c may be 5-8 mm. That is, each interlock hole 300 may be disposed with an edge distance b of at least 2.5 mm from the outer edge of recessed rigid portion 220 and a pitch distance c of 5-8 mm in relation to adjacent interlock holes 300. In other embodiments, optimal edge distance b and pitch distance c of interlock holes 300 may be greater than, less than, and/or any variation of the example distances provided above.

FIGS. 4A and 4B illustrate selected elements of an embodiment of a rigid plate coupled to a display chassis via an interlock portion. Specifically, FIG. 4A illustrates an example top view of recessed rigid portion 220 of rigid plate 120 coupled to recessed chassis portion 210 of display chassis 110 via interlock portion 200. FIG. 4B illustrates an example side view of recessed rigid portion 220 of rigid plate 120 coupled to recessed chassis portion 210 of display chassis 110 via interlock portion 200. In other embodiments, rigid plate 120 and display chassis 110 may include additional, fewer, and/or different components than the components shown in FIGS. 4A and 4B.

In the embodiment illustrated in FIG. 4A, interlock holes 300 of recessed rigid portion 220 are coupled with interlock pegs 400 of recessed chassis portion 210. In particular, each interlock hole 300 has received an interlock peg 400 such that recessed rigid portion 220 is coupled to recessed chassis portion 210 via interlock portion 200, thereby coupling rigid plate 120 to display chassis 110. In one embodiment, each interlock hole 300 may have an optimal diameter for receiving an interlock peg 400. That is, the diameter of each interlock hole 300 may be configured to provide an optimal clearance, or window, for bonding with an interlock peg 400 without compromising the structural integrity of recessed rigid portion 220 (e.g., causing recessed rigid portion 220 to become overly brittle). For example, am optimal diameter of each interlock hole 300 may be 3-5 mm. In one embodiment, display chassis 110 (and the interlock pegs 400 disposed thereon) may be comprised of a polycarbonate material such that each interlock peg 400 may bond to polycarbonate material within rigid plate 120 (e.g., within the interlock holes 300 disposed thereon) during an injection molding process to form interlock portion 200. That is, interlock portion 200 may be formed by coupling interlock pegs 400 of recessed chassis portion 210 of display chassis 110 to interlock holes 300 of recessed rigid portion 220 of rigid plate 120 in an injection molding process at a manufacturer of display 105 and/or information handling system 100.

In the embodiment illustrated in FIG. 4B, interlock hole 300 of recessed rigid portion 220 is coupled with interlock peg 400 of recessed chassis portion 210. Specifically, interlock hole 300 has received interlock peg 400 such that recessed rigid portion 220 is coupled to recessed chassis portion 210 via interlock portion 200, thereby coupling rigid plate 120 to display chassis 110. As shown in FIG. 4B, the main chassis portion of display chassis 110 may have a first chassis thickness f that is thicker in dimension than a second chassis thickness g of recessed chassis portion 210 extending from the main chassis portion. In one embodiment, the second chassis thickness g of recessed chassis portion 210 may be half (i.e., approximately 50%) as thick as the first chassis thickness f of the main chassis portion. For example, the second chassis thickness g of recessed chassis portion 210 may be 0.4-0.6 mm and the first chassis thickness f of the main chassis portion may be 0.8-1.2 mm. As shown in FIG. 4B, the first plate thickness e of the main rigid portion of rigid plate 120 and the first chassis thickness f of the main chassis portion of display chassis 110 may be equal in thickness (e.g., 0.8-1.2 mm). Similarly, the second plate thickness d of the recessed rigid portion 220 of rigid plate 120 and the second chassis thickness g of the recessed chassis portion 210 of display chassis 110 may be equal in thickness (e.g., 0.4-0.6 mm). As such, display chassis 110, interlock portion 200, and rigid plate 120 may be of a uniform reduced thickness (i.e., with respect to a z height), thereby accommodating a thinner design of display 105 that may be more desirable to consumers.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A display for an information handling system, comprising:
   a display chassis, including:
      a main chassis portion extending in a first plane and having a first chassis thickness; and
      a recessed chassis portion extending from the main chassis portion along the first plane and having a second chassis thickness less than the first chassis thickness, the recessed chassis portion including one or more interlock pegs disposed proximate to an edge of the recessed chassis portion;
   an interlock portion; and
   a rigid plate coupled to the display chassis via the interlock portion, the rigid plate including:
      a main rigid portion extending in the first plane and having a first plate thickness; and
      a recessed rigid portion extending from the main rigid portion along the first plane and having a second plate thickness less than the first plate thickness, the recessed rigid portion including one or more interlock holes disposed proximate to an edge of the recessed rigid portion, the one or more interlock pegs configured to couple to the one or more interlock holes to couple the rigid plate to the display chassis via the interlock portion.

2. The display of claim 1, wherein the second plate thickness is half as thick as the first plate thickness.

3. The display of claim 1, wherein the second chassis thickness is half as thick as the first chassis thickness.

4. The display of claim 1, wherein the first plate thickness and the first chassis thickness are equal in thickness.

5. The display of claim 1, wherein the second plate thickness and the second chassis thickness are equal in thickness.

6. The display of claim 1, wherein the rigid plate is comprised of a mixture including a carbon fiber and a polycarbonate material.

7. The display of claim 1, wherein the display chassis is comprised of a polycarbonate material.

8. The display of claim 1, wherein the interlock portion comprises a section of the display in which the recessed rigid portion of the rigid plate and the recessed chassis portion of the display chassis overlap.

9. The display of claim 1, wherein the interlock portion is formed by an injection molding process.

10. A rigid plate of a display for an information handling system, the rigid plate comprising:
   a main rigid portion extending in a first plane and having a first plate thickness; and
   a recessed rigid portion extending from the main rigid portion along the first plane and having a second plate thickness less than the first plate thickness, the recessed rigid portion including one or more interlock holes disposed proximate to an edge of the recessed rigid portion, the one or more interlock holes configured to couple the rigid plate to a display chassis of the display via an interlock portion,
   wherein the display chassis includes:
      a main chassis portion extending in the first plane and having a first chassis thickness; and
      a recessed chassis portion extending from the main chassis portion along the first plane and having a second chassis thickness less than the first chassis thickness, the recessed chassis portion including one or more interlock pegs disposed proximate to an edge of the recessed chassis portion, the one or more interlock pegs configured to couple to the one or more interlock holes to couple the rigid plate to the display chassis.

11. The rigid plate of claim 10, wherein the second plate thickness is half as thick as the first plate thickness.

12. The rigid plate of claim 10, wherein the second chassis thickness is half as thick as the first chassis thickness.

13. The rigid plate of claim 10, wherein the first plate thickness and the first chassis thickness are equal in thickness.

14. The rigid plate of claim 10, wherein the second plate thickness and the second chassis thickness are equal in thickness.

15. The rigid plate of claim 10, wherein the rigid plate is comprised of a mixture including a carbon fiber and a polycarbonate material.

16. The rigid plate of claim 10, wherein the display chassis is comprised of a polycarbonate material.

17. The rigid plate of claim 10, wherein the interlock portion comprises a section of the display in which the recessed rigid portion of the rigid plate and the recessed chassis portion of the display chassis overlap.

18. The rigid plate of claim 10, wherein the interlock portion is formed by an injection molding process.

* * * * *